United States Patent
Kaji

(10) Patent No.: US 10,351,197 B2
(45) Date of Patent: Jul. 16, 2019

(54) FRONT COWLING FOR SADDLE-RIDING TYPE VEHICLE

(71) Applicant: Kawasaki Jukogyo Kabushiki Kaisha, Kobe shi, Hyogo (JP)

(72) Inventor: Motoki Kaji, Akashi (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 15/700,787

(22) Filed: Sep. 11, 2017

(65) Prior Publication Data
US 2018/0086407 A1   Mar. 29, 2018

(30) Foreign Application Priority Data
Sep. 26, 2016 (JP) ................. 2016-187396

(51) Int. Cl.
*B62J 17/02* (2006.01)
*B62J 6/02* (2006.01)
*B62J 17/04* (2006.01)

(52) U.S. Cl.
CPC .............. *B62J 17/02* (2013.01); *B62J 6/02* (2013.01); *B62J 17/04* (2013.01)

(58) Field of Classification Search
CPC ....................................... B62J 17/02
USPC .............................................. 296/78.1
See application file for complete search history.

(56) References Cited

U.S. PATENT DOCUMENTS

| | | | |
|---|---|---|---|
| 7,325,853 B2 * | 2/2008 | Tsukui | B62J 17/02 296/180.1 |
| 7,607,712 B2 * | 10/2009 | Suita | B62J 17/02 296/78.1 |
| 8,881,859 B2 | 11/2014 | Nakamura | |
| 2012/0061989 A1 * | 3/2012 | Yasuhara | B62J 6/005 296/78.1 |
| 2013/0081896 A1 | 4/2013 | Nakamura | |

FOREIGN PATENT DOCUMENTS

JP        5921125        4/2016

\* cited by examiner

*Primary Examiner* — Joseph D. Pape

(57) ABSTRACT

A front cowling covers a front portion of a motorcycle, and a headlamp is mounted to the front cowling. The front cowling includes a lamp cowling part and a pair of left and right inner cowling parts. The lamp cowling part and the pair of inner cowling parts are integrally formed by molding. The lamp cowling part includes a lamp opening that allows a front surface of the headlamp to face outside. The inner cowling parts are coupled to inner sides of front portions of side cowlings, and guide incoming wind to a radiator.

2 Claims, 9 Drawing Sheets

FRONT COWLING FOR SADDLE-RIDING TYPE VEHICLE

CROSS REFERENCE TO THE RELATED APPLICATION

This application is based on and claims Convention priority to Japanese patent application No. 2016-187396, filed Sep. 26, 2016, the entire disclosure of which is herein incorporated by reference as a part of this application.

BACKGROUND OF THE INVENTION

Field of the Invention

The present invention relates to a front fairing or cowling configured to cover a front portion of a saddle-riding type vehicle.

Description of Related Art

A saddle-riding type vehicle such as a motorcycle is available that includes a front cowling which covers a front portion of the vehicle body and to which a headlamp is mounted. In such a motorcycle, an inner cowling configured to guide incoming wind to a radiator is provided inside the front cowling (e.g., JP Patent No. 5921125).

In JP Patent No. 5921125, the front cowling and the inner cowling are formed separately, and are each attached to the vehicle body. Accordingly, the number of components and the number of assembly steps are increased.

SUMMARY OF THE INVENTION

It is an object of the present invention to provide a front cowling for a saddle-riding type vehicle that requires a small number of components and is also easy to assemble.

In order to attain the above-described object, a front cowling for a saddle-riding type vehicle according to the present invention is configured to cover a front portion of a saddle-riding type vehicle and including: a lamp cowling part including a lamp opening therein that allows a front surface of a headlamp to face outside; and a pair of left and right inner cowling parts configured to be coupled to inner sides of front portions of a pair of left and right side cowlings, in which case the lamp cowling part and the pair of left and right inner cowling parts are formed of a single piece molded product.

According to this configuration, the lamp cowling part and the inner cowling parts are faulted of a single piece molded product, and therefore, the number of components is reduced, and the assembly is facilitated. The reduction in the number of components results in a smaller number of molds required, and therefore, it is also possible to reduce the number of production steps. Furthermore, since the lamp cowling part and the inner cowling parts are integrally molded, the dimensional accuracy is increased, thus facilitating improvement in the alignment of the components. Since the inner cowling parts are coupled to the side cowlings, the strength can be easily ensured, thus making it possible to reduce the thickness. Accordingly, even if the front cowling is increased in size as a result of the single piece molded production, it is possible to suppress the increase in weight, resulting in good handleability.

In the present invention, the front cowling may be supported by a vehicle body frame through at least the headlamp. According to this configuration, the front cowling and the headlamp share the same supporting portion to the vehicle body. Therefore, the structure is simplified, and the number of assembly steps is also reduced.

In this case, the lamp cowling part may include a locking portion configured to be engaged with an engaging portion of the headlamp and a fastening portion configured to be fastened to the headlamp. According to this configuration, the positioning between the front cowling and the headlamp is achieved by engagement between the locking portion and the engaging portion. Thus, the gap setting can be easily managed, and therefore, the gap between the front cowling and the headlamp can be easily set in a suitable manner. Thereafter, the attaching strength between the front cowling and the headlamp is enhanced by fastening with the fastening portion.

At least a part of a front surface of the front cowling according to the present invention may be covered by a cowling cover, the lamp opening may be formed by a closed opening edge, and a part of a peripheral edge portion of the lamp opening of the lamp cowling part may be covered by the cowling cover. With this configuration, the front cowling can be designed regardless of the shape of the cowling cover. For example, the cowling cover can be formed by a non-closed opening edge even when the periphery of the lamp opening of the front cowling is formed by a closed curve. Accordingly, the design quality can be enhanced for the cowling cover regardless of the shape of the front cowling, and therefore, the degree of freedom in design of the front cowling is increased.

Since the front cowling is covered by the cowling cover, any fastening member used to fasten the front cowling to the head lamp can be covered by the cowling cover, and therefore, the fastening member tends to be less likely to be exposed to the outside. Accordingly, it is possible to firmly attach the front cowling to the vehicle body, other cowlings and the like with the use of the fastening member, and also, the design quality can be secured. Furthermore, the increased rigidity makes it possible to also reduce the thickness of the portion of the front cowling, which portion is covered by the cowling cover. Therefore, it is possible to suppress the increase in weight.

A saddle-riding type vehicle according to the present invention includes the front cowling according to the present invention, in which case at least each of the inner cowling parts is covered by the corresponding one of the side cowlings from an outer lateral side, and a part of a front edge of each of the side cowlings extends along the corresponding one of the inner cowling parts in a vertical direction and also extends rearward toward a lower side, in side view.

According to this configuration, the inner cowling parts are covered by the side cowlings from the outer lateral side, and therefore, the inner cowling parts are not exposed to the outer lateral side. Thereby, the inner cowling parts is rendered to be inconspicuous, and accordingly, it is not necessary to provide decoration such as painting, coloring, or the like to the large front cowling.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, preferred embodiments of the present invention will be described with reference to the drawings. As used herein, the terms "left side" and "right side" refer to the left and right sides as viewed from a rider riding a vehicle.

Figure 1:
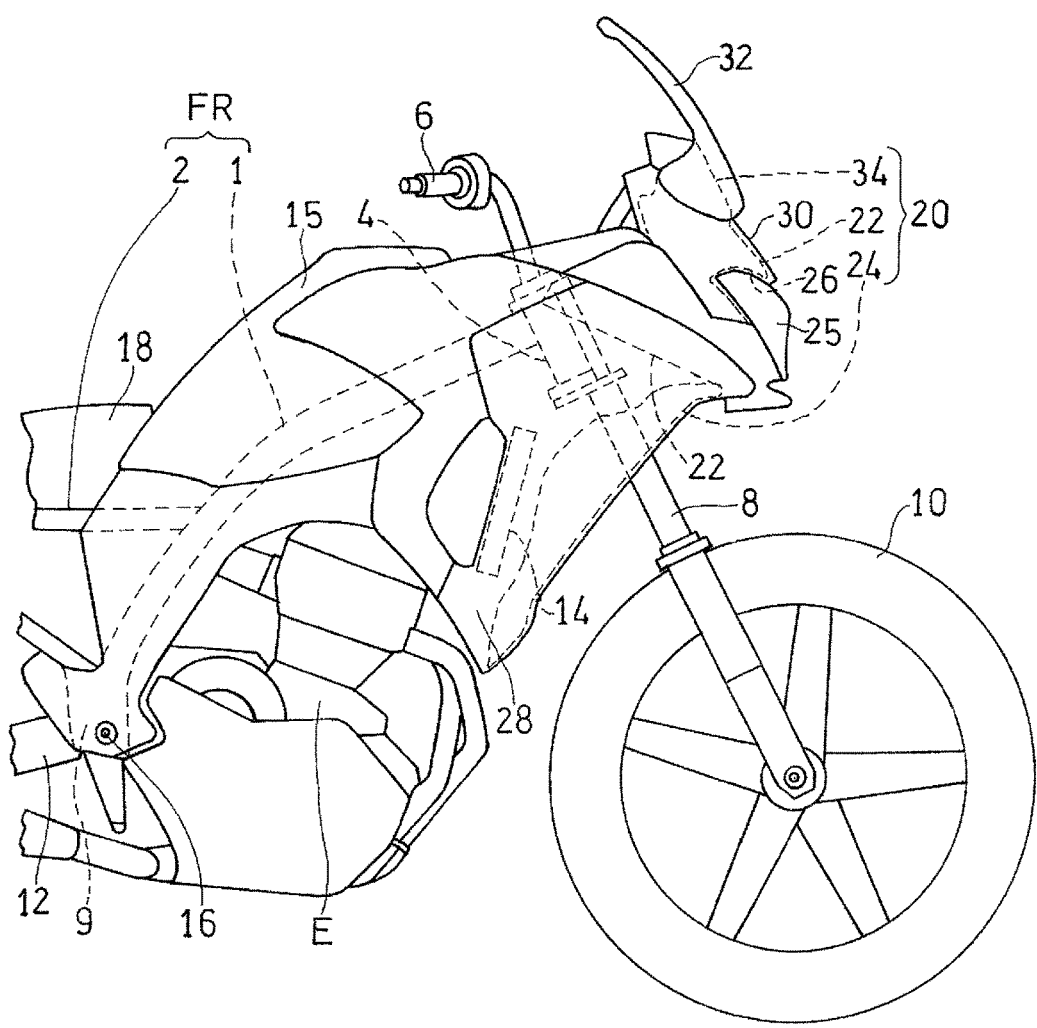
FIG. 1 is a side view showing a front portion of a motorcycle as a kind of a saddle-riding type vehicle including a front cowling according to a first embodiment of the present invention.

FIG. 1 is a side view showing a front portion of a motorcycle as a kind of a saddle-riding type vehicle including a front cowling according to a first embodiment of the present invention. A vehicle body frame FR of this motorcycle includes a main frame 1 that forms a front half thereof and a rear frame 2 that forms a rear half thereof. A head pipe 4 is provided at a front end of the main frame 1, and a front fork 8 is pivotably supported by the head pipe 4 through a steering shaft (not shown). A steering handle 6 is fixed to an upper end portion of the front fork 8, and a front wheel 10 is attached to a lower end portion of the front fork 8.

A swing arm bracket 9 is provided at a rear end portion of the main frame 1. A swing arm 12 is pivotally supported so as to be swingable in a vertical direction about a pivot shaft 16 attached to the swing arm bracket 9. A rear wheel (not shown) is rotatably supported at a rear end portion of the swing arm 12.

An engine E is attached to a lower portion of the main frame 1 on the front side of the swing arm bracket 9. The rotational force of the engine E is transmitted to the rear wheel through a power transmission member (not shown) such as a drive chain. A radiator 14 is disposed forward of and obliquely above the engine E. The radiator 14 dissipates the heat of the cooling water for the engine E by means of incoming wind. A fuel tank 15 is disposed above the main frame 1, and a seat 18 is supported by the rear frame 2.

A resin front fairing or cowling 20 is mounted to a front portion of the vehicle body. The front cowling 20 covers a front portion of the vehicle. As clearly shown in FIG. 3, the front cowling 20 includes a lamp cowling part 22, and a pair of left and right inner cowling parts 24, 24. The inner cowling parts 24 guide incoming wind to the radiator 14.

The lamp cowling part 22 and the inner cowling parts 24, 24 are integrally formed by molding. That is, the lamp cowling part 22 and the inner cowling parts 24, 24 are formed of a single piece molded product. A headlamp 25 shown in FIG. 1 that is mounted to the lamp cowling part 22 is a single-lamp headlamp disposed at a central portion in a vehicle widthwise direction.

The lamp cowling part 22 covers, in a region forward of the head pipe 4, an outer peripheral surface of the headlamp 25 that is disposed in this region. The lamp cowling part 22 includes a lamp opening 26 that allows the front surface of the headlamp 25 to face outside or forwardly. A part of the front surface of the lamp cowling part 22 of the front cowling 20, more specifically, an upper half of the lamp cowling part 22 is covered by a cowling cover 30 that is detachably attached to the front cowling 20. The inner cowling parts 24 extend obliquely downward to the rear from a lower end portion of a front end portion of the lamp cowling part 22.

A pair of left and right resin side cowlings 28, 28 are disposed rearward of the front cowling 20. Each side cowling 28 covers the head pipe 4 and the radiator 14 from the outer lateral side, and also covers a region above the engine E and a front portion of the fuel tank 15 from the outer lateral side. The side cowling 28 further covers the corresponding inner cowling part 24 of the front cowling 20 from the outer lateral side. More specifically, the side cowling 28 covers the whole of the inner cowling part 24 and a part of the lamp cowling part 22 from the outer lateral side.

The left and right inner cowling parts 24, 24 are coupled to inner sides of the front portions of the left and right side cowlings 28, 28, respectively. A part of a front edge of each of the side cowlings 28 extends along the front edge of the corresponding one of the inner cowling parts 24 in the up-down direction and also extends rearward towards the lower side in side view.

A windshield 32 is attached to an upper portion of the front cowling 20. The windshield 32 protects the rider from incoming wind. Specifically, a shield attachment portion 34 to which the windshield 32 is attached is formed in the front cowling 20, and the windshield 32 is detachably attached to the shield attachment portion 34. The shield attachment portion 34 is also integrally formed with the lamp cowling part 22 and the inner cowling parts 24 by molding. Only a part, of the front cowling 20, located between the side cowling 28 and the cowling cover 30 is exposed laterally outward in side view, and the remaining major part thereof is not exposed.

Figure 2:
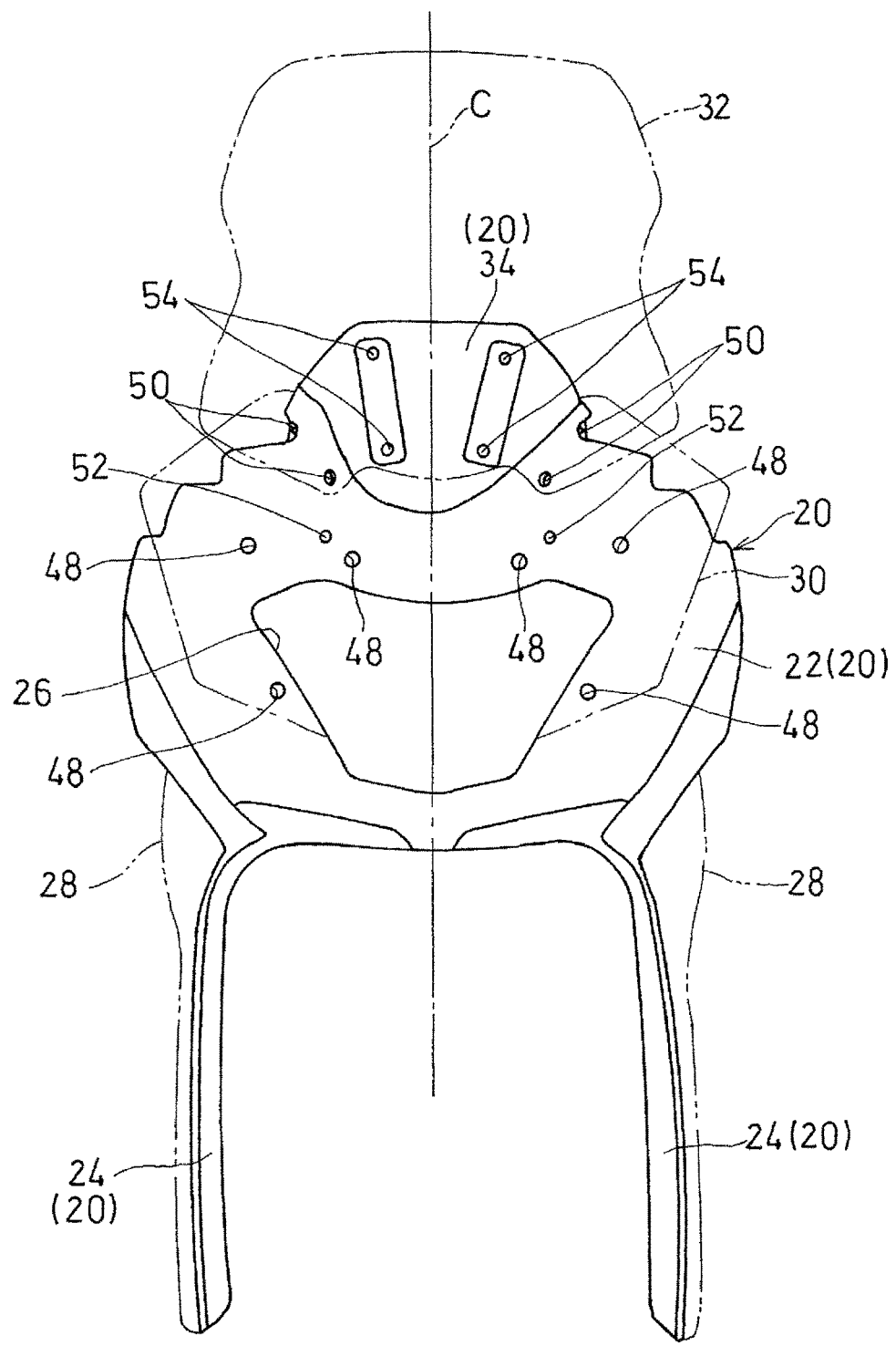
FIG. 2 is a front view showing the front cowling.

As shown in FIG. 2, the lamp opening 26 is formed by a closed opening edge formed by a closed curve. A part of the peripheral edge portion of the lamp opening 26 of the lamp cowling part 22 is covered by the cowling cover 30. More specifically, an upper half of the peripheral edge portion of the lamp opening 26 is covered by the cowling cover 30. Only a part, of the front cowling 20, located between the cowling cover 30 and the side cowling 28 is exposed to the outside in front view as well, and the remaining major part thereof is not exposed.

Figure 3:
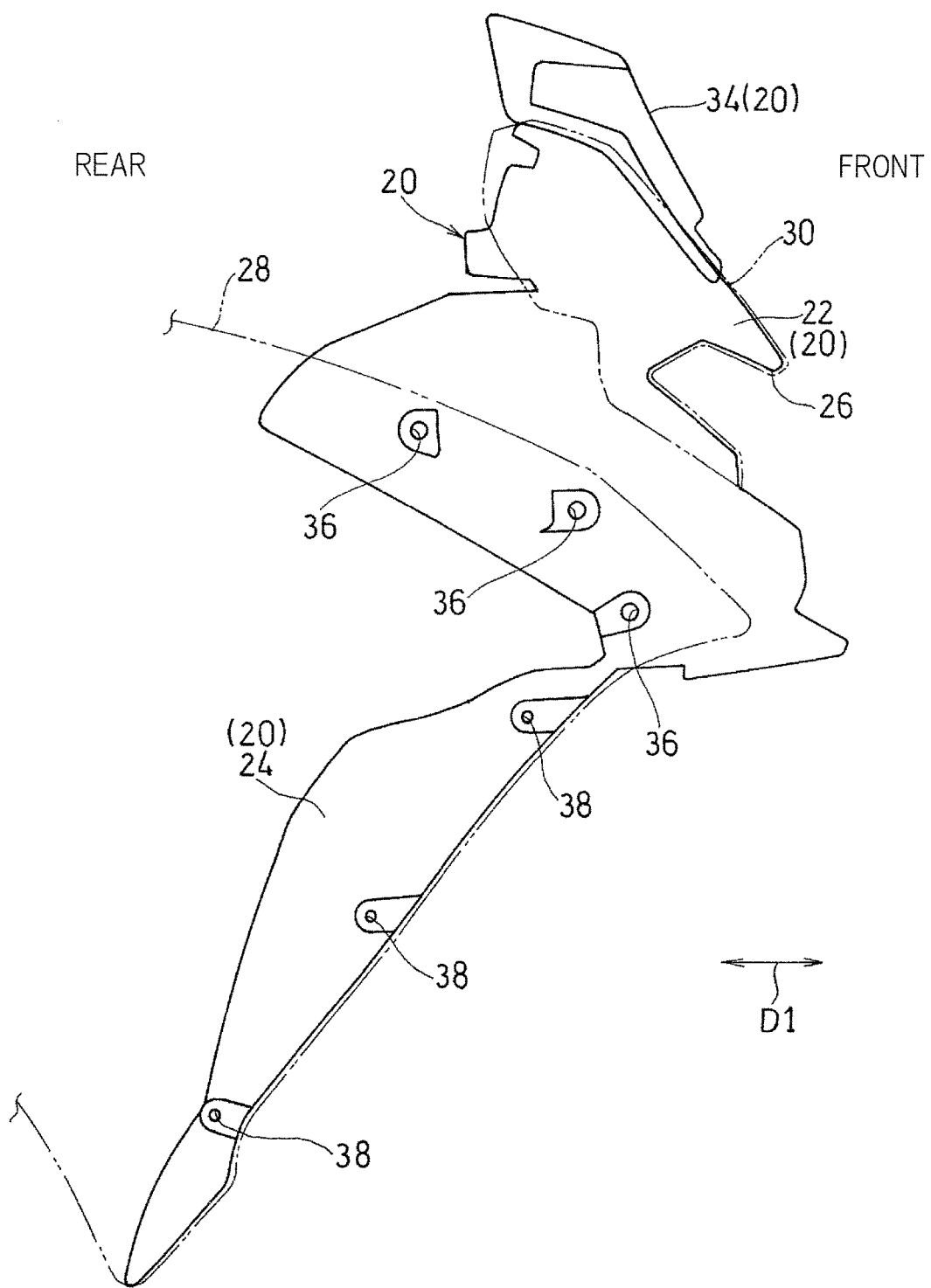
FIG. 3 is a side view showing the front cowling.

As shown in FIG. 3, the front cowling 20 has a shape in which its overall dimensions in the vertical direction are gradually decreased toward the front side in side view. More specifically, the front cowling 20 as a whole has a substantially triangular shape having a vertex at a front end in side view. Therefore, the front cowling 20 can be integrally formed by molding with the use of a trimming die in a front-rear direction or longitudinal direction D1 of the motorcycle.

In the present embodiment, polypropylene (PP) is used as the material of the front cowling 20. Polypropylene has a high strength while being light weight, and also has high heat resistance. On the other hand, polypropylene has low colorability and is thus not suitable for a component with high design quality. However, as described above, the major part of the front cowling 20 in the present embodiment are not exposed to the outside. Therefore, it is possible to focus on the improvement in the strength of the front cowling 20 without the need to place importance on the external appearance thereof. Notably, the material of the front cowling 20 is not limited to polypropylene, and may be an AES (acrylonitrile ethylene-propylene-diene styrene), a glass fiber-reinforced polypropylene, or the like.

In the present embodiment, ABS (acrylonitrile-butadiene-styrene) is used as the material of the side cowlings 28 and the cowling cover 30, which are design components. ABS has an excellent surface aesthetic appearance, and also has excellent colorability. Therefore, ABS is suitable for a design component.

Pin insertion holes 36, directed in the vehicle widthwise direction, are formed in a portion, of the lamp cowling part 22 of the front cowling 20, which portion is covered by each side cowling 28. In the present embodiment, three pin insertion holes 36 are formed in a side surface of the lower portion of the lamp cowling part 22 so as to be aligned in the longitudinal direction of the motorcycle. However, the number of the pin insertion holes 36 is not limited thereto.

Insertion holes 38, directed in the vehicle widthwise direction, are formed in a front portion of each inner cowling part 24 of the front cowling 20. In the present embodiment, three insertion holes 38 are formed in a side surface of the inner cowling part 24, along the front edge of the inner cowling part 24. However, the number of the insertion holes 38 is not limited thereto.

Figure 4:
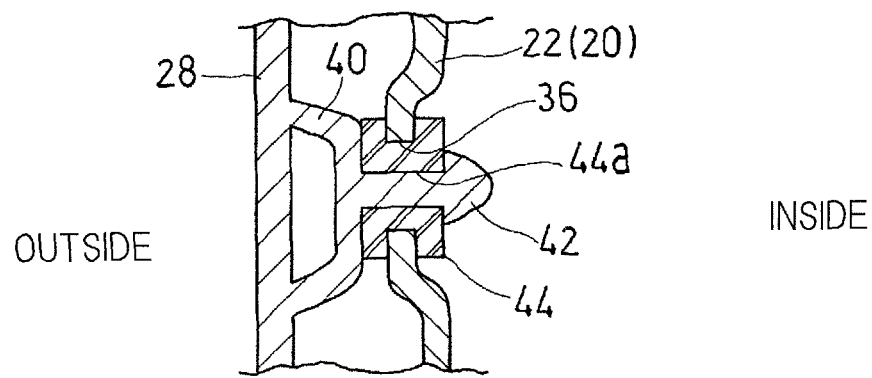
FIG. 4 is a cross-sectional view showing an engaging portion between a side cowling and the front cowling.

FIG. 4 is a cross-sectional view showing an engaging portion between the lamp cowling part 22 of the front cowling 20 and the side cowling 28. As shown in FIG. 4, a boss portion 40 bulging inward in the vehicle widthwise direction is formed on the inner surface of the side cowling 28 at a position corresponding to a pin insertion hole 36. A projection 42 protruding inward in the vehicle widthwise direction is formed at the boss portion 40. Three boss portions 40 and three projections 42 are provided so as to correspond to the pin insertion holes 36.

A cylindrical elastic member 44 having flanges at opposite ends, such as a rubber damper, is mounted to the pin insertion hole 36 of the lamp cowling part 22. The projection 42 of the side cowling 28 is fitted to a hollow hole 44a of the elastic member 44 from the outer lateral side in the vehicle widthwise direction. Although FIG. 4 shows only one engaging portion, the engaging portions of the three pin insertion holes 36 have the same structure. Thereby, the upper portions of the front portions of the side cowlings 28 are attached to the front cowling 20. In this way, the attachment of the side cowlings 28 to the front cowling 20 is achieved by insertion of the projections 42, and therefore, the attachment can be performed easily.

Figure 5:
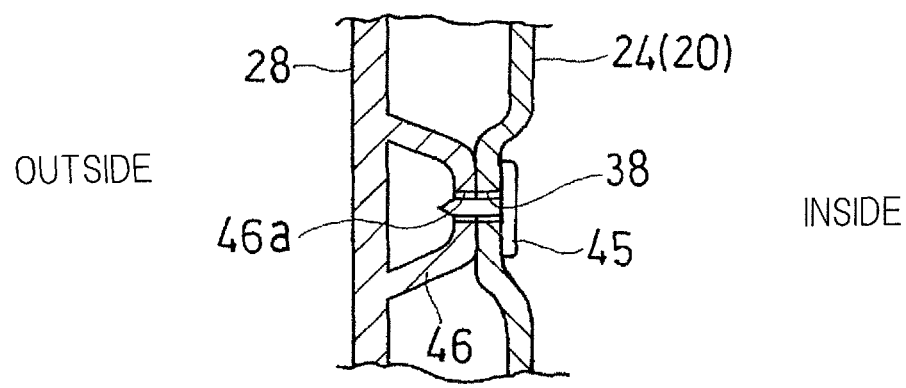
FIG. 5 is a cross-sectional view showing a coupling portion between the front cowling and the side cowling.

FIG. 5 is a cross-sectional view showing a coupling structure between the inner cowling part 24 of the front cowling 20 and the side cowling 28. As shown in FIG. 5, a boss portion 46 bulging inward in the vehicle widthwise direction is formed on the inner surface of the side cowling 28 at a position corresponding to an insertion hole 38. An attachment hole 46a, directed in the vehicle widthwise direction, is formed in the boss portion 46. Three boss portions 46 are provided so as to correspond to the insertion holes 38.

A fastening member 45 is inserted through the insertion hole 38 of the inner cowling part 24 from the inner side in the vehicle widthwise direction, and is fastened to the attachment hole 46a of the side cowling 28. In the present embodiment, a resin rivet is used as the fastening member 45. However, the fastening member 45 is not limited thereto. Although FIG. 5 shows one coupling portion, the coupling portions of the three insertion holes 38 have the same structure. Thereby, an intermediate portion to the lower portion, in the vertical direction, of the front portion of the side cowling 28 is attached to the front cowling 20.

By the engaging structure shown in FIG. 4 and the coupling structure shown in FIG. 5, the front half of each side cowling 28 is attached to the front cowling 20. The rear half of the side cowling 28 is supported by the outer surface of the fuel tank 15 and the main frame 1 shown in FIG. 1.

As shown in FIG. 2, cover engaging holes 48 are formed in a portion, of the lamp cowling part 22, which portion is covered by the cowling cover 30. Each of the cover engaging holes 48 is formed by a through hole directed in the longitudinal direction of the motorcycle. The cover engaging holes 48 are provided at the peripheral edge portion of the lamp opening 26 of the lamp cowling part 22. More specifically, three cover engaging holes 48 are formed on each of the left and right sides across a center line C in the vehicle widthwise direction, along the peripheral edge of the lamp opening 26. As the three cover engaging holes 48 on each of the right and left sides, one cover engaging hole 48 is provided laterally outward of the lamp opening 26, and two cover engaging holes 48 are provided above the lamp opening 26 so as to be aligned in the vehicle widthwise direction.

Furthermore, cover attachment holes 50 are formed in a portion of, the lamp cowling part 22, which portion is covered by the cowling cover 30. The cover attachment holes 50 are directed obliquely laterally outward to the front. The cover attachment holes 50 are provided at an upper end portion of the lamp cowling part 22, or in other words, in the vicinity of the shield attachment portion 34. More specifically, two cover attachment holes 50 are formed on each of the left and right sides across the center line C in the vehicle widthwise direction so as to be aligned in the longitudinal direction of the motorcycle.

Bolt insertion holes 52, directed in the longitudinal direction of the motorcycle, are formed in the lamp cowling part 22. The bolt insertion holes 52 constitute fastening portions that are fastened to the headlamp 25. One bolt insertion hole 52 is formed on each of the left and right sides across the center line C in the vehicle widthwise direction. More specifically, each bolt insertion hole 52 is provided above the lamp opening 26 and between the two cover engaging holes 48 located on the upper side.

Shield attachment holes 54 configured to attach the windshield 32 are formed in the shield attachment portion 34. The shield attachment holes 54 are each formed by a through hole directed obliquely upward to the front. Two shield attachment holes 54 are formed on each of the left and right sides across the center line C in the vehicle widthwise direction. The two shield attachment holes 54 on each of the left and right sides are provided so as to be aligned in the vertical direction.

Figure 6:
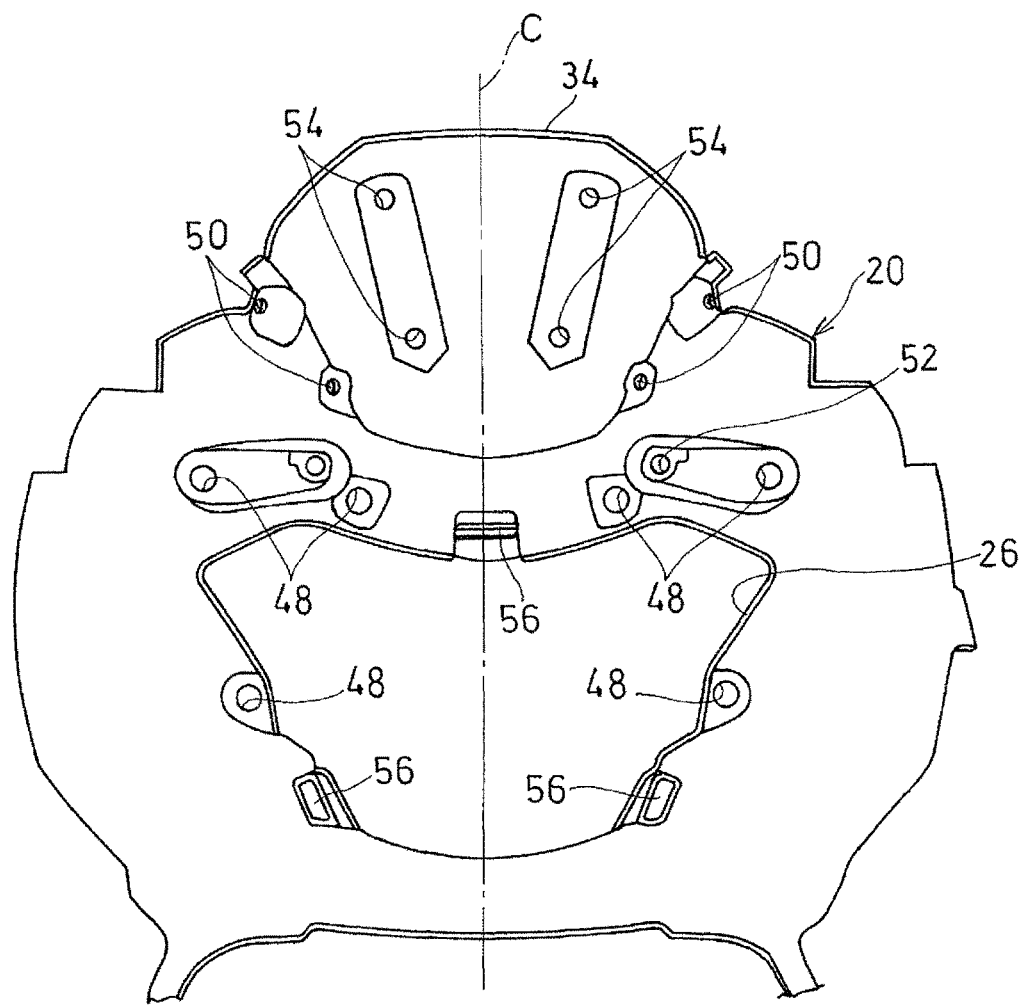
FIG. 6 is a rear view showing a lamp cowling part of the front cowling.

FIG. 6 is a rear view of the lamp cowling part 22. As shown in FIG. 6, protruding pieces 56 protruding rearward are formed in the peripheral edge portion of the lamp opening 26 on the inner surface (back surface) of the lamp cowling part 22. The protruding pieces 56 constitute locking portions 56 that are engaged with engaging portions 58 (FIG. 7), which will be described later, of the headlamp 25. The protruding pieces 56 each have a rectangular shape having a long axis direction extending in a direction along the peripheral edge of the lamp opening 26.

In the present embodiment, three protruding pieces 56 are provided. More specifically, two protruding pieces 56 are provided at lower portions of the peripheral edge portion of the lamp opening 26 on both sides across the center line C in the vehicle widthwise direction, and one protruding piece 56 is provided above the lamp opening 26 on the center line C in the vehicle widthwise direction. That is, in the present embodiment, three protruding pieces 56 are provided so as to form an isosceles triangle with the protruding piece 56 located on the upper side as a vertex, as viewed in the longitudinal direction of the motorcycle. However, the number, the position, and the shape of the protruding pieces 56 are not limited thereto.

Figure 7:
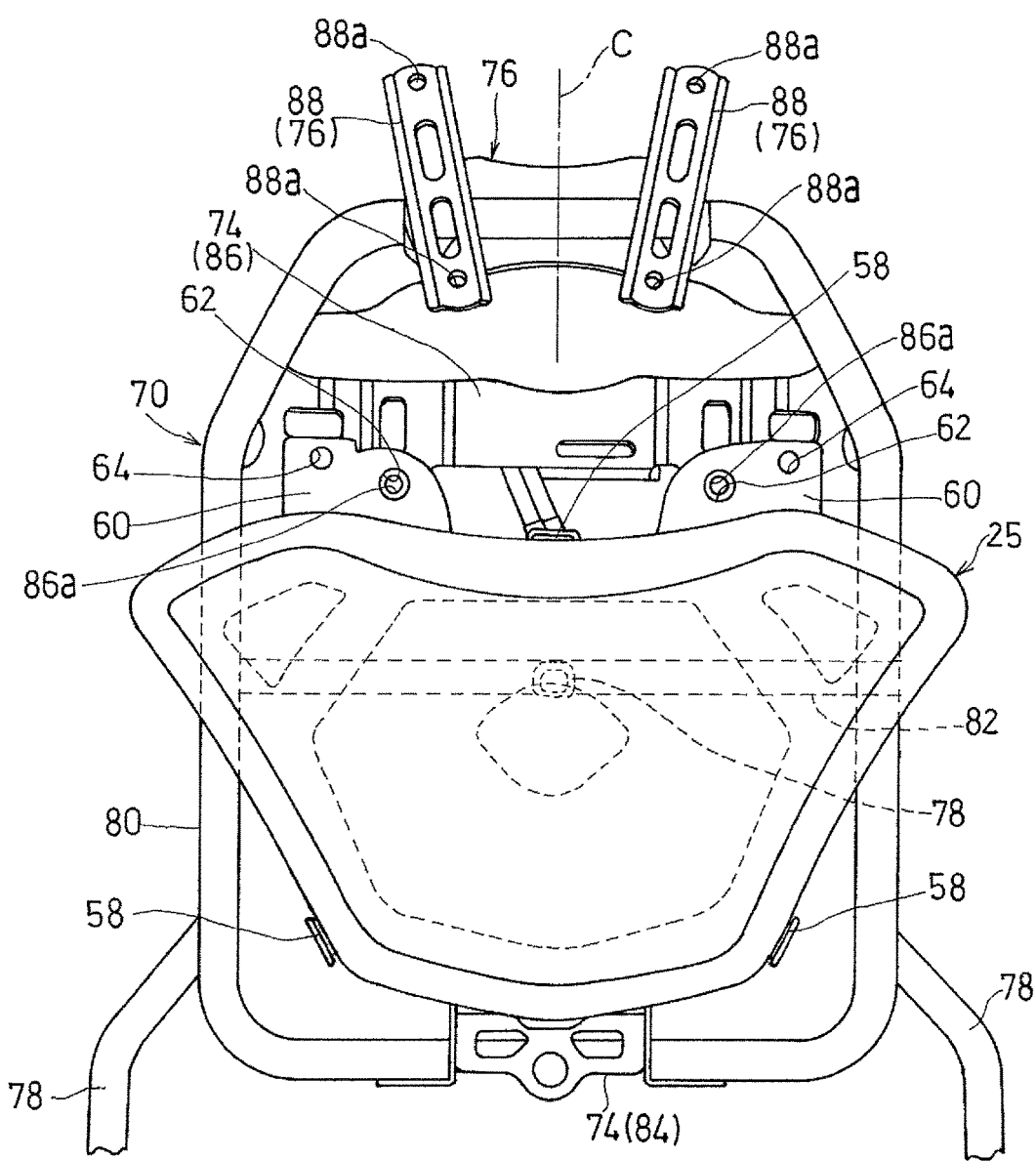
FIG. 7 is a front view showing a headlamp and a cowling stay of the motorcycle.

As shown in FIG. 7, which is a front view, engaging holes 58 are formed in the outer peripheral edge of the headlamp 25 at positions corresponding to the protruding pieces 56 of the lamp cowling part 22. The engaging holes 58 constitute the engaging portions 58 with which the protruding pieces 56 (FIG. 6) are engaged. The engaging holes 58 are openings having a rectangular shape that matches the shape of the protruding pieces 56. Three engaging holes 58 are provided so as to correspond to the protruding pieces 56.

Attachment pieces 60 protruding upward are formed on an upper end face of the headlamp 25. Two attachment pieces 60 are formed across the center line C in the vehicle widthwise direction so as to be aligned in the vehicle widthwise direction. A bolt insertion hole 62 and a screw hole 64 are formed in each of the attachment pieces 60. The bolt insertion holes 62 and the screw holes 64 are directed in the longitudinal direction of the motorcycle, and are provided so as to be aligned in the vehicle widthwise direction, with the bolt insertion holes 62 located on the inner side.

Figure 8:
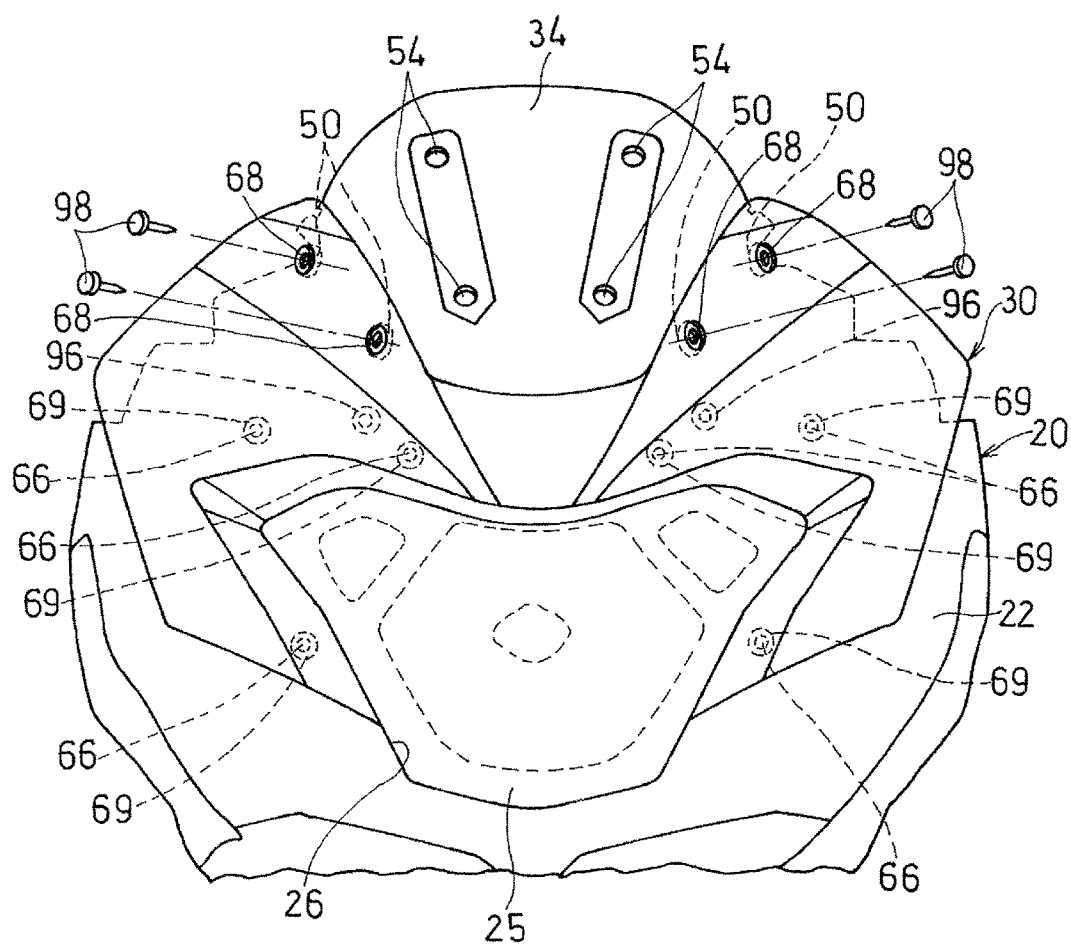
FIG. 8 is a front view showing the lamp cowling part, the headlamp, and a cowling cover.

As shown in FIG. 8, projections 66 protruding rearward (inward) are formed on the rear surface (back surface) of the cowling cover 30 at positions corresponding to the cover engaging holes 48 of the front cowling 20. The engaging structure between the projections 66 and the respective corresponding cover engaging holes 48 is the same as the engaging structure between the projection 42 of the side cowling 28 and the pin insertion hole 36 of the front cowling 20 shown in FIG. 4. That is, the cowling cover 30 shown in FIG. 8 is attached to the front cowling 20 through elastic members 69.

Screw insertion holes 68 are formed in the cowling cover 30 at positions corresponding to the cover attachment holes 50 of the front cowling 20. The screw insertion holes 68 are each formed by a through hole directed obliquely upward to the front. The number of the screw insertion holes 68 is the same as that of the cover attachment holes 50, or in other words, four.

Figure 9:
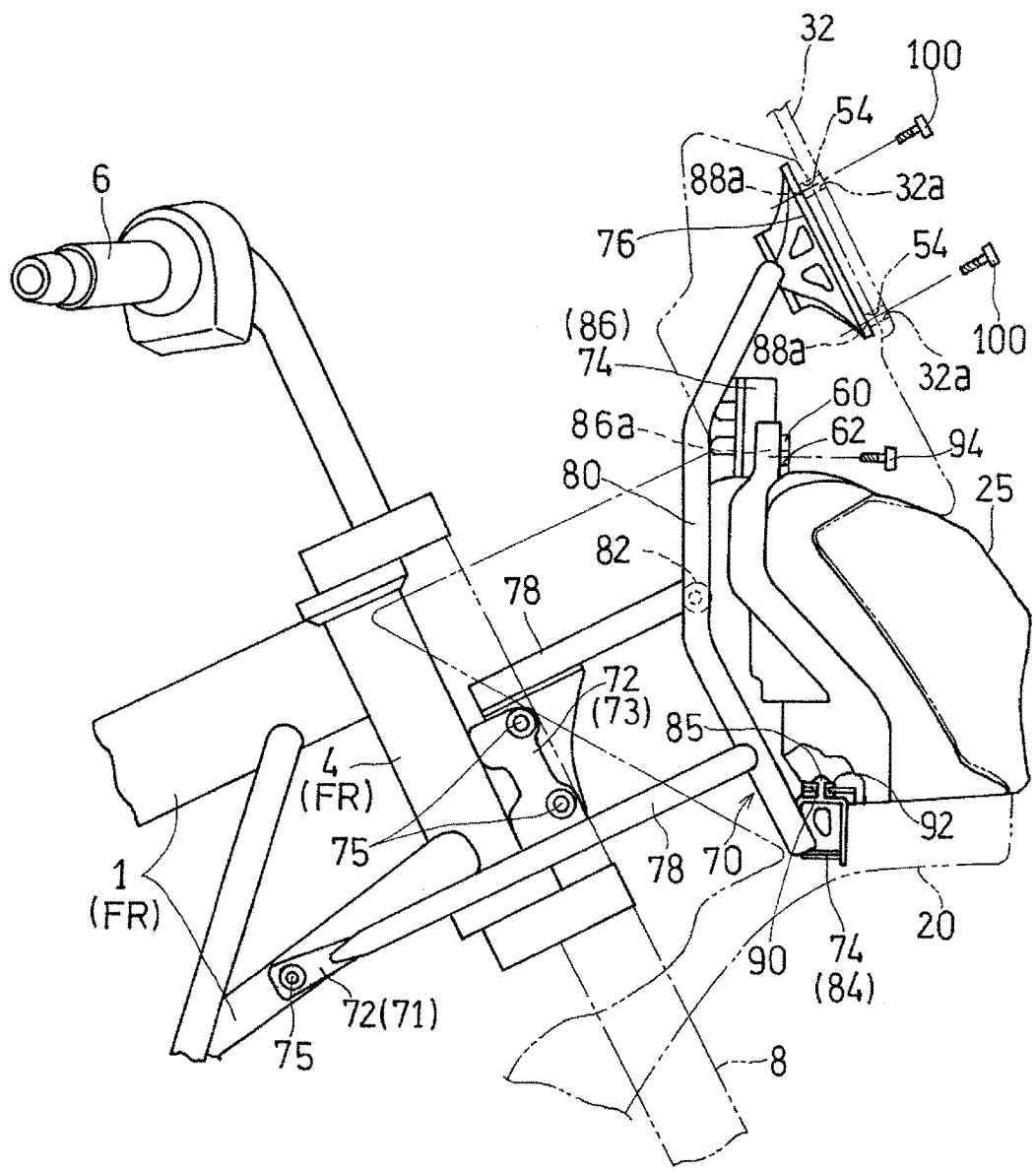
FIG. 9 is a side view showing the front portion of the motorcycle.

As shown in FIG. 9, the front cowling 20 and the headlamp 25 are supported by the vehicle body frame FR through a cowling stay 70. The cowling stay 70 includes: a to-be-supported portion 72 that is supported by the vehicle body frame FR; a lamp supporting portion 74 that supports the headlamp 25 in front of the vehicle body frame FR; and a cowling supporting portion 76 that supports the front cowling 20 above the lamp supporting portion 74. The to-be-supported portion 72, the lamp supporting portion 74, and the cowling supporting portion 76 are coupled by first to third coupling pipes 78, 80, and 82.

The to-be-supported portion 72 includes a pair of left and right first supported sections 71 that are coupled to the main frame 1, and a second supported section 73 that is coupled to the head pipe 4 located at the front end of the main frame 1. The first supported sections 71 and the second supported section 73 are detachably coupled to the main frame 1 and the head pipe 4, respectively, with bolts 75.

The first coupling pipe 78 extends to forwardly from the to-be-supported portion 72, and is coupled to the second coupling pipe 80. As shown in FIG. 7, the second coupling pipe 80 is formed by bending a pipe into a substantially rectangular frame shape in front view. The second coupling pipe 80 has intermediate portions, in the vertical direction, coupled by the third coupling pipe 82 extending in the vehicle widthwise direction. The lower first coupling pipe 78 extending from the first supported section 71 is coupled to a lower portion of the second coupling pipe 80. The upper first coupling pipe 78 extending from the second supported section 73 is coupled to the third coupling pipe 82. The first coupling pipe 78, the second coupling pipe 80, and the third coupling pipe 82 are joined by welding.

The lamp supporting portion 74 includes a lower supporting portion 84 that supports a lower portion of the headlamp 25, and an upper supporting portion 86 that supports an upper portion of the headlamp 25. The lower supporting portion 84 is joined to a central portion, in the vehicle widthwise direction, of a lower end portion of the second coupling pipe 80. The lower supporting portion 84 is formed by bending a sheet metal. As shown in FIG. 9, protruding portions 85 protruding upward are formed on an upper surface of the lower supporting portion 84. Two protruding portions 85 are provided so as to be aligned in the vehicle widthwise direction.

The upper supporting portion 86 is joined to an upper portion of the second coupling pipe 80. More specifically, the upper supporting portion 86 is joined at a position, of the second coupling pipe 80, which position is upward of the third coupling pipe 82. As shown in FIG. 7, the upper supporting portion 86 is formed of a sheet metal, and extends in the vehicle widthwise direction so as to span across opposite end portions, in the vehicle widthwise direction, of the second coupling pipe 80. Screw holes 86a are formed in the upper supporting portion 86 at positions corresponding to the bolt insertion holes 62 of the headlamp 25. Each of the screw holes 86a is directed in the longitudinal direction of the motorcycle. In the present embodiment, the screw holes 86a are constituted by weld nuts.

The cowling supporting portion 76 is joined to a central portion, in vehicle widthwise direction, of an upper end portion of the second coupling pipe 80. As shown in FIG. 9, the cowling supporting portion 76 includes cowling attachment portions 88 protruding obliquely upward to the front from the upper end of the second coupling pipe 80. The cowling attachment portions 88 are each made of a sheet metal, and each include an attachment surface that is directed obliquely upward to the front. As shown in FIG. 7, a pair of left and right cowling attachment portions 88 are provided across the center line C in the vehicle widthwise direction. Two screw holes 88a are provided at each of the cowling attachment portions 88 so as to be aligned in the vertical direction. In the present embodiment, the screw holes 88a are constituted by weld nuts.

A structure of attaching the front cowling 20 to the vehicle body will be described. First, the headlamp 25 shown in FIG. 9 is attached to the cowling stay 70. More specifically, cylindrical elastic members 92 such as rubber dampers are mounted to through holes 90 which are provided at a lower portion of the headlamp 25 and directed in the vertical direction. The protruding portions 85 of the lower supporting portion 84 of the cowling stay 70 are fitted to the hollow holes of the elastic members 92. By so doing, the lower portion of the headlamp 25 is supported by the cowling stay 70, and the headlamp 25 is positioned relative to the vehicle body frame FR.

Furthermore, at the upper portion of the headlamp 25, bolts 94 are inserted through the bolt insertion holes 62 of the headlamp 25 from the front, and are fastened to the screw holes 86a of the upper supporting portion 86 of the cowling stay 70. By so doing, the upper portion of the headlamp 25 is supported by the cowling stay 70. Thus, the headlamp 25 is attached to the vehicle body through the cowling stay 70.

Thereafter, the left and right side cowlings 28 are attached to the front cowling 20, to assemble a sub-assembly. The attachment of the front portions of the side cowlings 28 to the front cowling 20 is achieved by the engaging structure shown in FIG. 4 and the coupling structure shown in FIG. 5.

Figure 10:
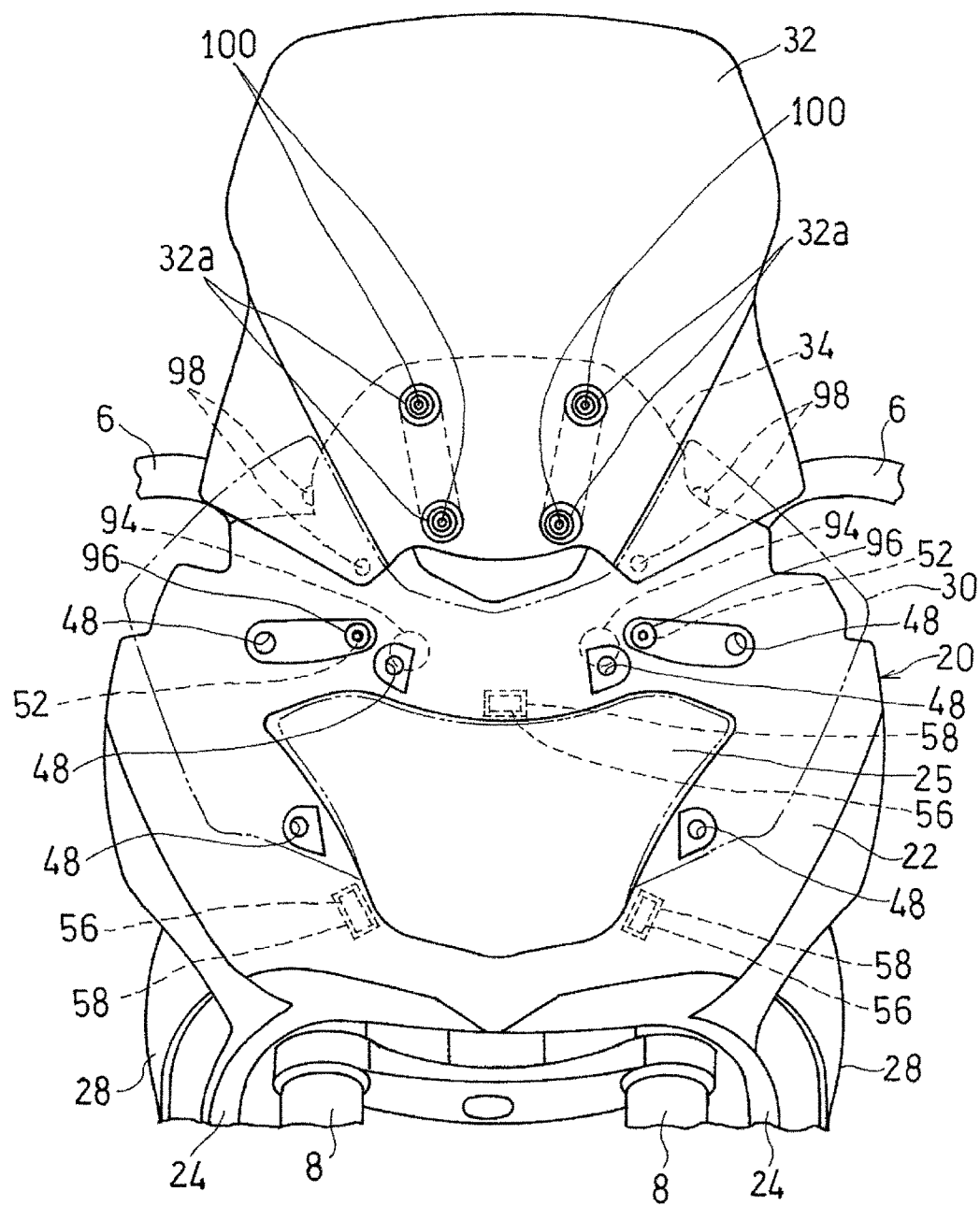
FIG. 10 is a front view showing the front portion of the motorcycle.

Subsequently, the front cowling 20 (sub-assembly) is mounted to the headlamp 25. Specifically, the protruding pieces 56 of the front cowling 20 shown in FIG. 6 are placed into the engaging holes 58 of the headlamp 25 shown in FIG. 7 from the front. In the present embodiment, an elastic member (not shown) is also interposed between each protruding piece 56 of the front cowling 20 and the corresponding engaging hole 58 of the headlamp 25. As shown in FIG. 10, three engaging locations of the protruding pieces 56 and the engaging holes 58 are provided along the lamp opening 26. Accordingly, due to the engagement between the protruding pieces 56 and the engaging holes 58, a gap is less likely to be formed between the headlamp 25 and the lamp cowling part 22 of the front cowling 20.

Furthermore, bolts 96 are inserted through the bolt insertion holes 52 of the front cowling 20 from the front, and are fastened to the screw holes 64 (FIG. 7) of the headlamp 25. By so doing, the front cowling 20 is supported by the headlamp 25. Thus, the headlamp 25 is attached to the vehicle body through the cowling stay 70. The bolts 94 that couple the headlamp 25 and the cowling stay 70 are covered by the front cowling 20, and thus are not exposed to the outside. In this manner, the front cowling 20 is supported by the vehicle body frame FR through the headlamp 25. The rear portions of the side cowlings 28 shown in FIG. 1 are supported by side surfaces of the fuel tank 15 and the main frame 1.

Then, the cowling cover 30 is attached to the front cowling 20. Specifically, the projections 66 of the cowling cover 30 shown in FIG. 8 are inserted into the cover engaging holes 48 of the front cowling 20 from the front. The fitting structure between the projections 66 and the respective corresponding cover engaging holes 48 is the same as the engaging structure between the projection 42 of the side cowling 28 and the pin insertion hole 36 of the front cowling 20 shown in FIG. 4. As shown in FIG. 8, six engaging locations between the projections 66 and the cover engaging holes 48 are provided along the lamp opening 26. Accordingly, due to the engagement between the projections 66 and the cover engaging holes 48, a gap is less likely to be formed between the cowling cover 30 and the front cowling 20.

Furthermore, fastening members 98 are inserted into the screw insertion holes 68 of the cowling cover 30, and are fastened to the cover attachment holes 50 of the front cowling 20. In the present embodiment, resin rivets are used as the fastening members 98. By so doing, the front cowling 20 is attached to the headlamp 25. The bolts 96 that couple the headlamp 25 and the front cowling 20 are covered by the cowling cover 30, and thus are not exposed to the outside.

Subsequently, the front cowling 20 and the windshield 32 shown in FIG. 9 are attached to the cowling stay 70. Specifically, bolts 100 are inserted into screw insertion holes 32a provided in the windshield 32 and then the shield attachment holes 54 of the front cowling 20 in this order, and are then fastened to the screw holes 88a of the cowling attachment portion 88 of the cowling stay 70. By so doing, the front cowling 20 and the windshield 32 are fastened together to the cowling stay 70.

With the above-described configuration, the lamp cowling part 22 and the inner cowling parts 24 are integrally formed by molding. Accordingly, the number of components is reduced, and also, the assembly is facilitated. The reduction in the number of components results in a smaller number of molds required, and therefore, it is also possible to reduce the number of production steps. Furthermore, since the lamp cowling part 22 and the inner cowling parts 24 are integrally molded, the dimensional accuracy is increased, thus facilitating improvement in the alignment of the components. Since the inner cowling parts 22 are coupled to the side cowlings 28, the strength can be easily ensured, thus making it possible to reduce the thickness. Accordingly, even if the front cowling 20 is increased in size as a result of the integral formation, it is possible to suppress the increase in weight, resulting in good handleability.

In the front cowling 20 of the above-described embodiment, the shield attachment portion 34 to which the windshield 32 is attached is also integrally formed by molding, and the shield attachment portion 34 and the windshield 32 are fastened together to the cowling supporting portion 76 of the cowling stay 70 with the common bolts 100. Thereby, the front cowling 20 and the windshield 32 are firmly coupled to the cowling stay 70 with the use the bolts 100, and also, the number of bolts is reduced, resulting in a smaller number of attaching steps required.

As shown in FIG. 10, the front cowling 20 is attached to the headlamp 25 by the structure of engaging the protruding pieces 56 to the engaging holes 58, and the structure of fastening the bolts 96. The positioning between the front cowling 20 and the headlamp 25 can be achieved by this engaging structure, and also, the gap setting can be easily managed. Accordingly, the gap between the front cowling 20 and the headlamp 25 can be easily set in a suitable manner. Further, the attaching strength between the front cowling 20 and the headlamp 25 is enhanced by fastening of the bolts 96.

The front cowling 20 is supported by the vehicle body frame FR through the headlamp 25. Thereby, the front cowling 20 and the headlamp 25 share the same supporting portion to the vehicle body. Accordingly, the structure is simplified and the number of assembly steps is also reduced. The lamp opening 26 of the front cowling 20 shown in FIG. 8 is formed by a closed opening, and a peripheral edge portion of the lamp opening 26 of the lamp cowling part 22 is covered by the cowling cover 30. Thereby, the front cowling 20 can be designed regardless of the shape of the cowling cover 30. Specifically, the cowling cover 30 can be formed by a non-closed opening edge even when the periphery of the lamp opening 26 of the front cowling 20 is formed by a closed curve. Accordingly, the design quality can be enhanced for the cowling cover 30 regardless of the shape of the front cowling 20. Therefore, the degree of freedom in design of the front cowling 20 is increased.

Furthermore, the thickness of a portion, of the front cowling 20, which portion is covered by the cowling cover 30 can also be reduced. Accordingly, it is possible to suppress the increase in weight of the front cowling 20, while enhancing the handleability. Moreover, the front cowling 20 is covered by the cowling cover 30, and therefore, the bolts 96 are covered by the cowling cover 30 and thus are not exposed to the outside. Accordingly, it is possible to firmly attach the front cowling 20 to the vehicle body with the use of the bolts 96, and also ensure the design quality.

Since the inner cowling parts 24 of the front cowling 20 shown in FIG. 1 are covered by the side cowlings 28 from the outer lateral side, the inner cowling parts 24 are not exposed to the outer lateral side. Thereby, the front cowling 20 is rendered to be inconspicuous, and therefore, it is not necessary to provide decoration such as painting, coloring, or the like to the larger front cowling 20. This makes it possible to form the larger front cowling 20 by using inexpensive polypropylene.

The present invention is not limited to the embodiment described above, and various additions, modifications, or deletions may be made without departing from the gist of the invention. For example, although the above embodiment has described a saddle-riding type vehicle including a single-bulb headlamp 25, the front cowling 20 according to the present invention is applicable to a saddle-riding type vehicle including a double-bulb headlamp. Although the above embodiment has described an example in which the front cowling 20 according to the present invention is applied to a motorcycle, the front cowling 20 according to the present invention is also applicable to a saddle-riding type vehicle other than a motorcycle, including, for example, a three-wheeled vehicle and a four-wheeled buggy or all-terrain vehicle. Therefore, such vehicles are also construed as included within the scope of the present invention.

REFERENCE NUMERALS

20 . . . front cowling
22 . . . lamp cowling part
24 . . . inner cowling part
25 . . . headlamp
26 . . . lamp opening
28 . . . side cowling
30 . . . cowling cover
32 . . . windshield
34 . . . shield attachment portion
52 . . . bolt insertion hole (fastening portion)
56 . . . protruding piece (locking portion)
58 . . . engaging hole (engaging portion)
FR . . . vehicle body frame

What is claimed is:

1. A front cowling for a saddle-riding type vehicle, the front cowling being configured to cover a front portion of a saddle-riding type vehicle body and comprising:
   a lamp cowling part including a lamp opening therein that allows a front surface of a headlamp to face outside; and
   a pair of left and right inner cowling parts configured to be coupled to inner sides of front portions of a pair of left and right side cowlings, wherein;
   the lamp cowling part and the pair of left and right inner cowling parts are each formed of a single piece of a molded product;
   at least a part of a front surface of the front cowling is covered by a cowling cover;
   the lamp opening is formed by a closed opening edge; and
   a part of a peripheral edge portion of the lamp opening of the lamp cowling part is covered by the cowling cover.

2. A saddle-riding type vehicle comprising:
   an engine as a drive source;
   a radiator disposed forwardly of the engine, the radiator dissipating heat of a cooling water for the engine by means of incoming wind; and
   a front cowling configured to cover a front portion of the saddle-riding type vehicle body, wherein;
   the front cowling comprises: a lamp cowling part including a lamp opening therein that allows a front surface of a headlamp to face outside; and a pair of left and right inner cowling parts configured to be coupled to inner sides of front portions of a pair of left and right side cowlings;
   the lamp cowling part and the pair of left and right inner cowling parts are formed of a single piece molded product;
   each of the inner cowling parts extends obliquely downward from a lower end portion of a front end portion of the lamp cowling part;
   at least each of the inner cowling parts is covered by the corresponding one of the side cowlings from an outer lateral side;
   a part of a front edge of each of the side cowlings extends along the corresponding one of the inner cowling parts in a vertical direction and also extends rearward toward a lower side, in side view; and
   each of the inner cowling parts has a lower end extending downwardly across a lower end of the radiator, and is configured to guide incoming wind to the radiator.

* * * * *